US012613024B1

(12) United States Patent
Wang

(10) Patent No.: US 12,613,024 B1
(45) Date of Patent: *Apr. 28, 2026

(54) TENTACLE ANIMAL BIONIC LAMP

(71) Applicant: Shenzhen Maichen Suchuang Technology Co., Ltd., Shenzhen (CN)

(72) Inventor: Haichao Wang, Shenzhen (CN)

(73) Assignee: Shenzhen Maichen Suchuang Technology Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 19/008,952

(22) Filed: Jan. 3, 2025

(51) Int. Cl.
*F21V 14/06* (2006.01)
*F21V 23/04* (2006.01)

(52) U.S. Cl.
CPC .......... *F21V 14/06* (2013.01); *F21V 23/0435* (2013.01)

(58) Field of Classification Search
CPC .... F21V 14/06; F21V 23/0435; F21V 14/065; F21V 14/00; F21V 21/00; F21V 21/06; F21V 21/14; F21V 21/145; F21V 23/00
See application file for complete search history.

(56) References Cited

U.S. PATENT DOCUMENTS 6,123,600 A * 9/2000 Yuen .................... A63H 11/205
446/280
12,129,976 B2 * 10/2024 Wang .................... F21V 23/003
2024/0302011 A1 9/2024 Wang

FOREIGN PATENT DOCUMENTS

CN 218565341 U 3/2023

* cited by examiner

*Primary Examiner* — Bao Q Truong
(74) *Attorney, Agent, or Firm* — Westbridge IP LLC

(57) ABSTRACT

A tentacle animal bionic lamp comprises a shell component and a plurality of curved tentacles; a driving device for driving the tentacles to rotate is arranged in the shell; a control device and a light source are arranged in the shell. According to the solution, the driving device is arranged in the shell to drive the tentacles to rotate, so as to achieve a good visual effect without the need of a complicated transmission structure, thereby simplifying the structure of the product; at the same time, the control is realized through the control device, which can assist in operations and improve the user experience.

20 Claims, 14 Drawing Sheets

TENTACLE ANIMAL BIONIC LAMP

TECHNICAL FIELD

The present application relates to the technical field of lamps, in particular to a tentacle animal bionic lamp.

BACKGROUND

After a long period of development, light sources have been widely used in many fields besides lighting, such as providing atmosphere and instructions, and decorating or setting off the environment.

In order to improve the visual effect, people design lamps in various shapes, such as animal or plant shapes.

In Chinese Patent Publication No. CN218565341U, a jellyfish lamp decoration with tentacles rotating function is disclosed, which is made with reference to the unique shape of jellyfish and has a good visual effect.

The solution discloses a jellyfish lamp decoration with tentacles rotating function, which comprises a base, wherein a circuit board, a power supply and a motor are arranged in the base; a reduction gear device comprising a driving gear, a driven gear and a transmission gear assembly; a jellyfish tentacle assembly fixedly arranged above the driven gear through a vertical rod, and comprising a mounting frame and a plurality of optical fibers arranged around the mounting frame; a rotation auxiliary device installed above the mounting frame and comprising an intermediate gear and a plurality of unit gears meshed with the outer side of the intermediate gear at intervals; wherein the upper end of a vertical rod passes through the mounting frame and is fixedly connected to the intermediate gear; and the upper end of an optical fiber passes through the mounting frame and is fixedly connected to an unit gear; a lamp bead installed above the unit gear. This solution can present the tentacles of jellyfish in the form of luminous optical fiber, and the visual effect is good.

However, there are still some shortcomings in this solution, its driving device is arranged on the base, many parts are used, the structure is complex, the energy loss in the transmission process is large, the transmission efficiency is low, the manufacturing cost is high and it is easy to cause failures; in addition, because the base is necessarily used, the scenes where it may be used are limited.

It is disclosed in the description thereof that the switch is arranged on the base cover, but in which way the switch is controlled and which functions can be realized are not disclosed. Therefore, it can be considered that the control mode of this solution is single, and the inductive control and the adjustment of the luminous effect of the lamp beads cannot be realized.

Therefore, it is necessary to design a new structure to solve the problems existing in the prior art.

SUMMARY

The present application provides a tentacle animal bionic lamp, which includes a shell component and a plurality of curved tentacles detachably connected with the shell component; wherein the shell component comprises a shell made of a light-transmitting material, and a driving device for driving the tentacles to rotate is arranged in the shell; a control device is arranged in the shell, the control device comprises a printed circuit board (PCB) board electrically connected with the driving device; the shell is further provided with a light source electrically connected with the PCB board; the driving device comprises a driving motor, and an output shaft of the driving motor is provided with a driving gear; a driven gear set is rotatably arranged on the shell, and the driving gear is meshed with the driven gear set; the tentacles are detachably connected to the driven gear set, and the driving motor drives each tentacle to rotate independently through the driven gear set.

In the above solution, the shell is made of a light-transmitting material, and the driving device is arranged in the shell to drive the tentacles to rotate independently, so that the visual effect is good, and a complicated transmission structure is not needed, thus greatly simplifying the structure of the product; because the control component and driving component are arranged in the shell, the product structure is compact; at the same time, various control methods can be realized through the control device, thereby facilitating operation and improve user experience.

A tentacle animal bionic lamp includes a shell component and a plurality of curved tentacles detachably connected with the shell component; wherein the shell component comprises a shell consisting of a lower shell and an upper shell which are detachably connected, and the lower shell is made of a hard material; the upper shell is made of a light-transmitting flexible material; a driving device for driving the tentacles to rotate is arranged in the shell; a control device is arranged in the shell, the control device comprises a PCB board, the driving device is electrically connected with the PCB board; the shell is further provided with a light source electrically connected with the PCB board; the driving device comprises a driving motor, and an output shaft of the driving motor is provided with a driving gear; a driven gear set is rotatably arranged on the lower shell, and the driving gear is meshed with the driven gear set; the tentacles are detachably connected to the driven gear set, and the driving motor drives each tentacle to rotate independently through the driven gear set.

In the above solution, the lower shell is made of a hard material, and the upper shell is made of a light-transmitting flexible material, which can adapt to outdoor use scenes, and the spherical upper shell can be folded, transported and stored, saving space; the driving device is arranged in the shell to drive the tentacles to rotate independently, so that the visual effect is good, and a complicated transmission structure is not needed, thus greatly simplifying the structure of the product; because the control components and driving components are arranged in the shell, the product structure is compact; at the same time, various control methods can be realized through the control device, thereby facilitating operation and improve user experience.

A tentacle animal bionic lamp includes a shell component and a plurality of curved tentacles detachably connected with the shell component; wherein the shell component comprises a shell made of a light-transmitting material, and a driving device for driving the tentacles to rotate is arranged in the shell; a control device is arranged in the shell, the control device comprises a PCB board, and the driving device is electrically connected with the PCB board; the shell is further provided with a light source electrically connected with the PCB board; the driving device comprises a driving motor, and an output shaft of the driving motor is provided with a driving gear; a rotating disc is rotatably arranged on the shell, a driven gear is arranged on the rotating disc, and the driving gear is meshed with the driven gear; the tentacles are detachably connected to the rotating disc, and the driving motor drives all the tentacles to rotate as a whole through the rotating disc.

According to the solution, the driving device is arranged in the shell to drive the tentacles to rotate, and a complicated transmission structure is not needed; compared with the previous solution, the solution is simpler in structure, and all the tentacles can rotate; because the control component and driving component are arranged in the shell, the product structure is compact; at the same time, various control methods can be realized through the control device, thereby facilitating operation and improve user experience.

DETAILED DESCRIPTION OF THE EMBODIMENTS

As shown in FIGS. 1 to 11, a tentacle animal bionic lamp includes a shell component 1 and a plurality of curved tentacles 2 detachably connected with the shell component 1.

The shell component 1 includes a shell.

In this embodiment, the tentacle animal bionic lamp is designed to be similar to the shape of jellyfish.

The shell includes a lower shell 11 and an upper shell 12, both of which are made of hard materials, preferably hard light-transmitting materials, such as PE, PC, PS or glass.

Figure 3:
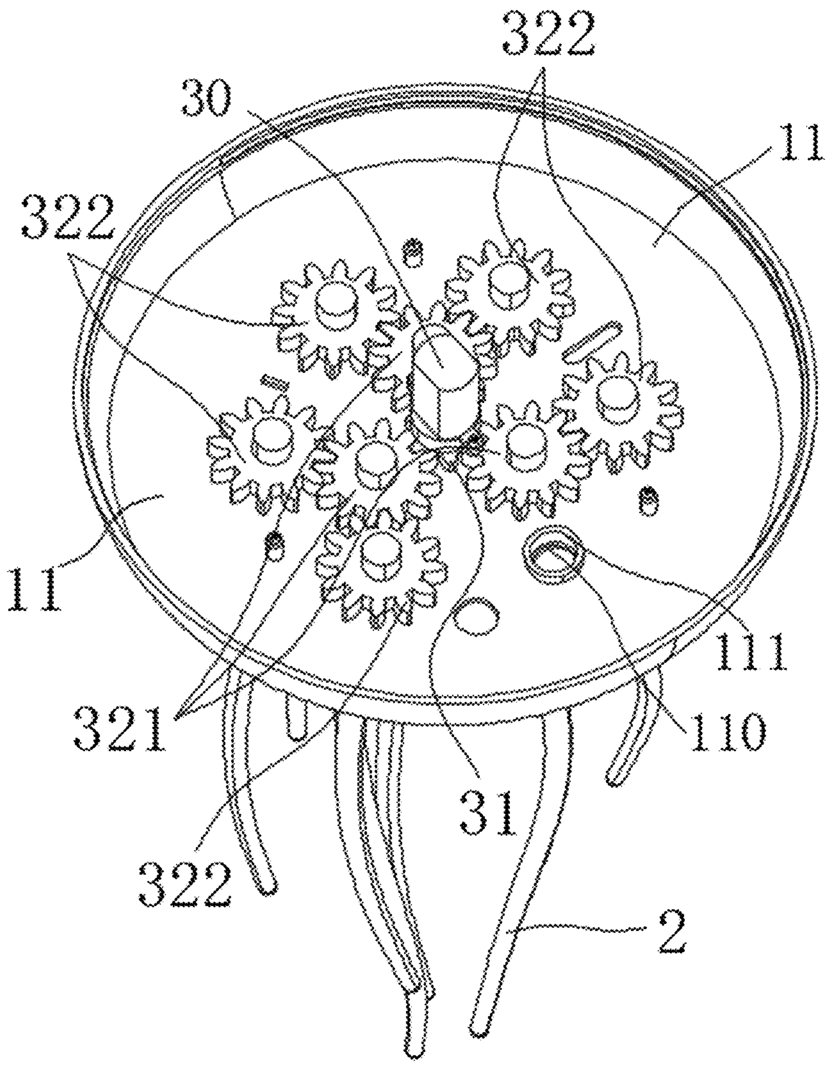
FIG. 3 is a schematic diagram of the first installation structure of the gear according to the first embodiment of the present application.

As shown in FIG. 3, the lower shell 11 is provided with a first through hole 110, and an annular flange 111 with an inner diameter larger than that of the first through hole 110 is provided inside the lower shell 11, and the annular flange 111 is coaxially arranged with the first through hole 110.

Figure 4:
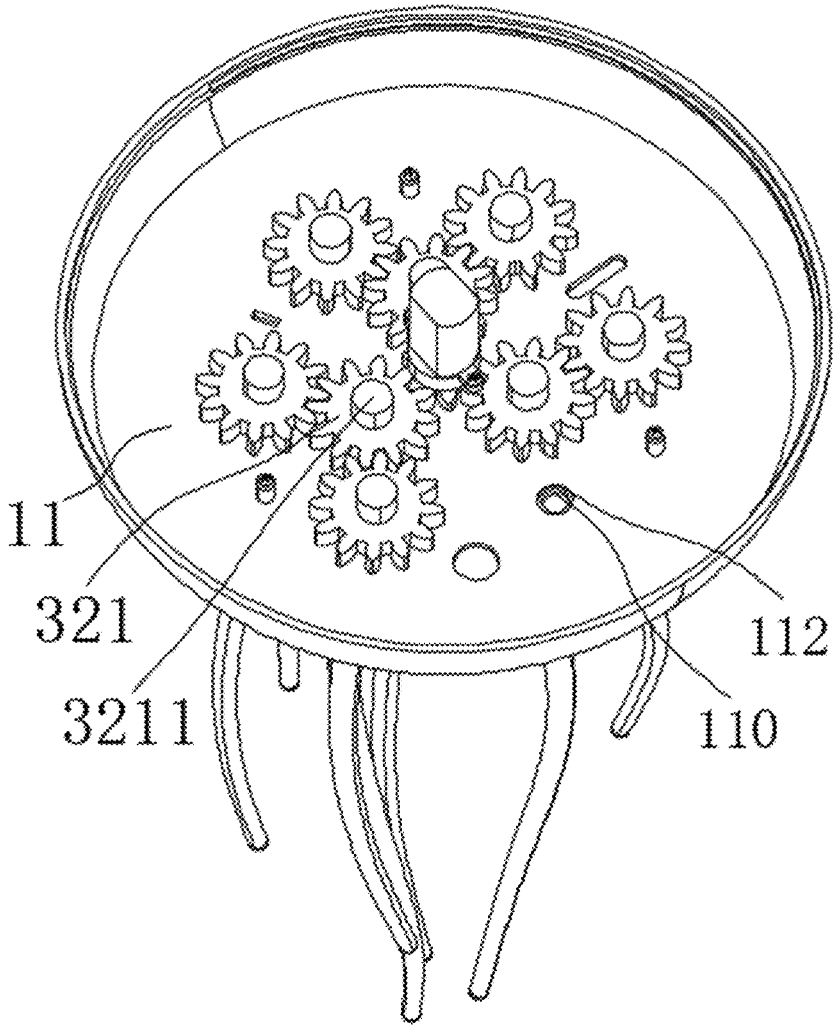
FIG. 4 is a schematic diagram of a second installation structure of the gear according to the first embodiment of the present application.

As shown in FIG. 4, as another embodiment, an annular counterbore 112 with an inner diameter larger than that of the first through hole 110 is provided in the lower shell 11, and the annular counterbore 112 is coaxially arranged with the first through hole 110.

The arrangement of the annular flange 111 and the annular counterbore 112 is used to limit the bottom of the gear.

Figure 1:
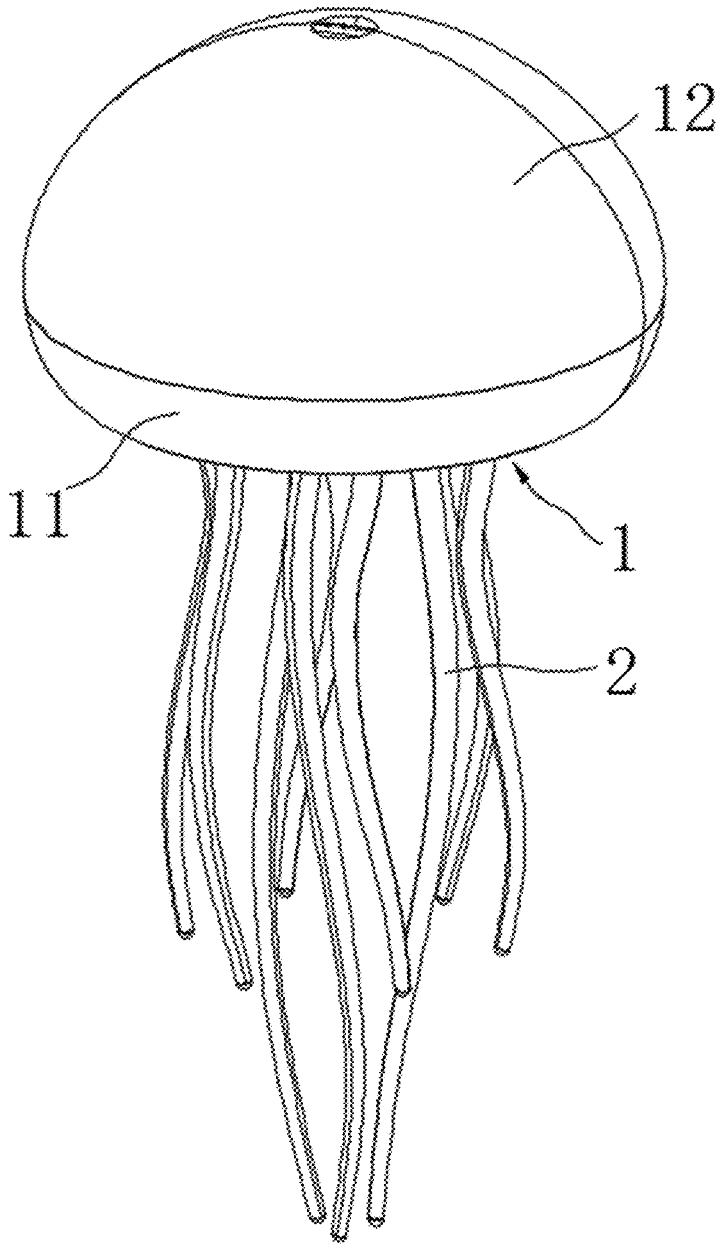
FIG. 1 is a structural schematic diagram of a first embodiment of the present application.
Figure 2:
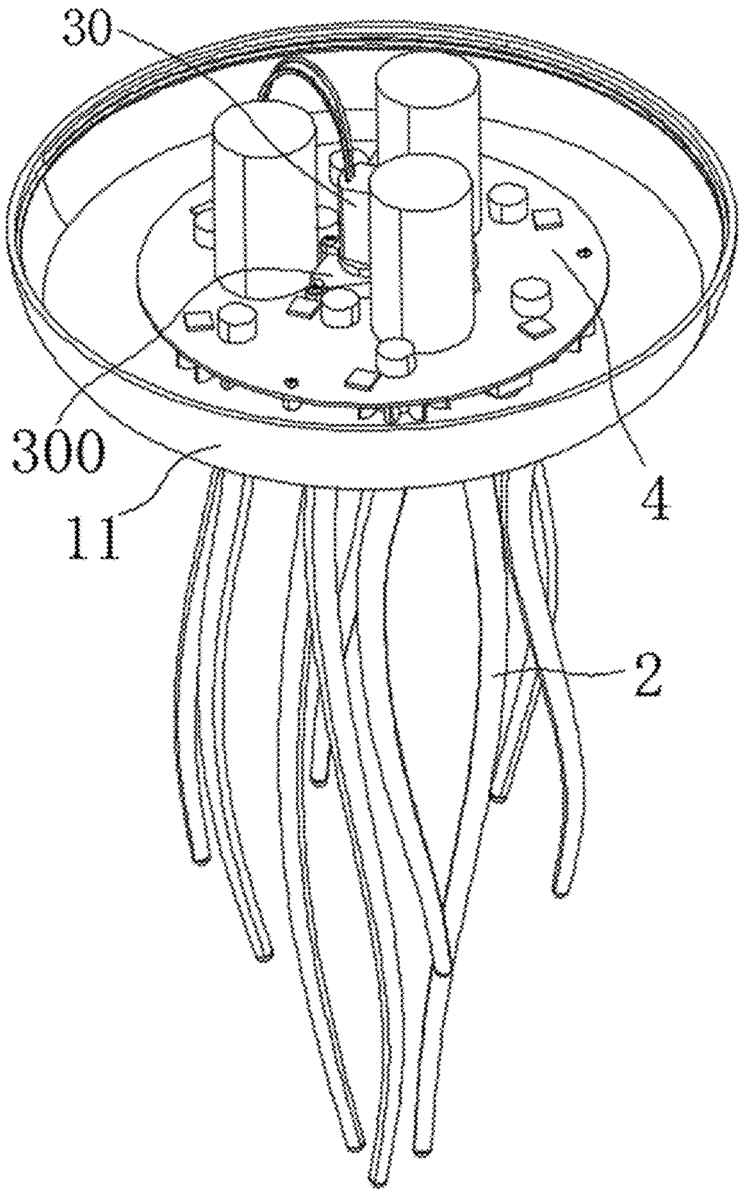
FIG. 2 is a schematic structural view of the first embodiment of the present application after the upper shell is removed.

As shown in FIGS. 2 and 3, a driving device for driving the tentacles 2 to rotate is arranged in the shell. In this embodiment, the driving device includes a driving motor 30, which is fixed on the lower shell 11 through a motor bracket 300, and a driving gear 31 is arranged on the output shaft of the driving motor 30.

A driven gear set is rotatably arranged on the shell, the driving gear 31 is meshed with the driven gear set. The tentacles 2 are detachably connected to the driven gear set, and the driving motor 30 drives each tentacle 2 to rotate independently through the driven gear set.

In this embodiment, the driven gear set includes a first driven gear set and a second driven gear set.

The driving gear 31 is meshed with the first driven gear set; the first driven gear set is meshed with the second driven gear set.

The first driven gear set includes more than three first gears 321; the second driven gear set includes more than six second gears 322.

In this embodiment, the number of the first gears 321 is three, and the number of the second gears 322 is twice that of the first gears 321, and one of the first gears 321 drives two of the second gears 322 to rotate.

Figure 5:
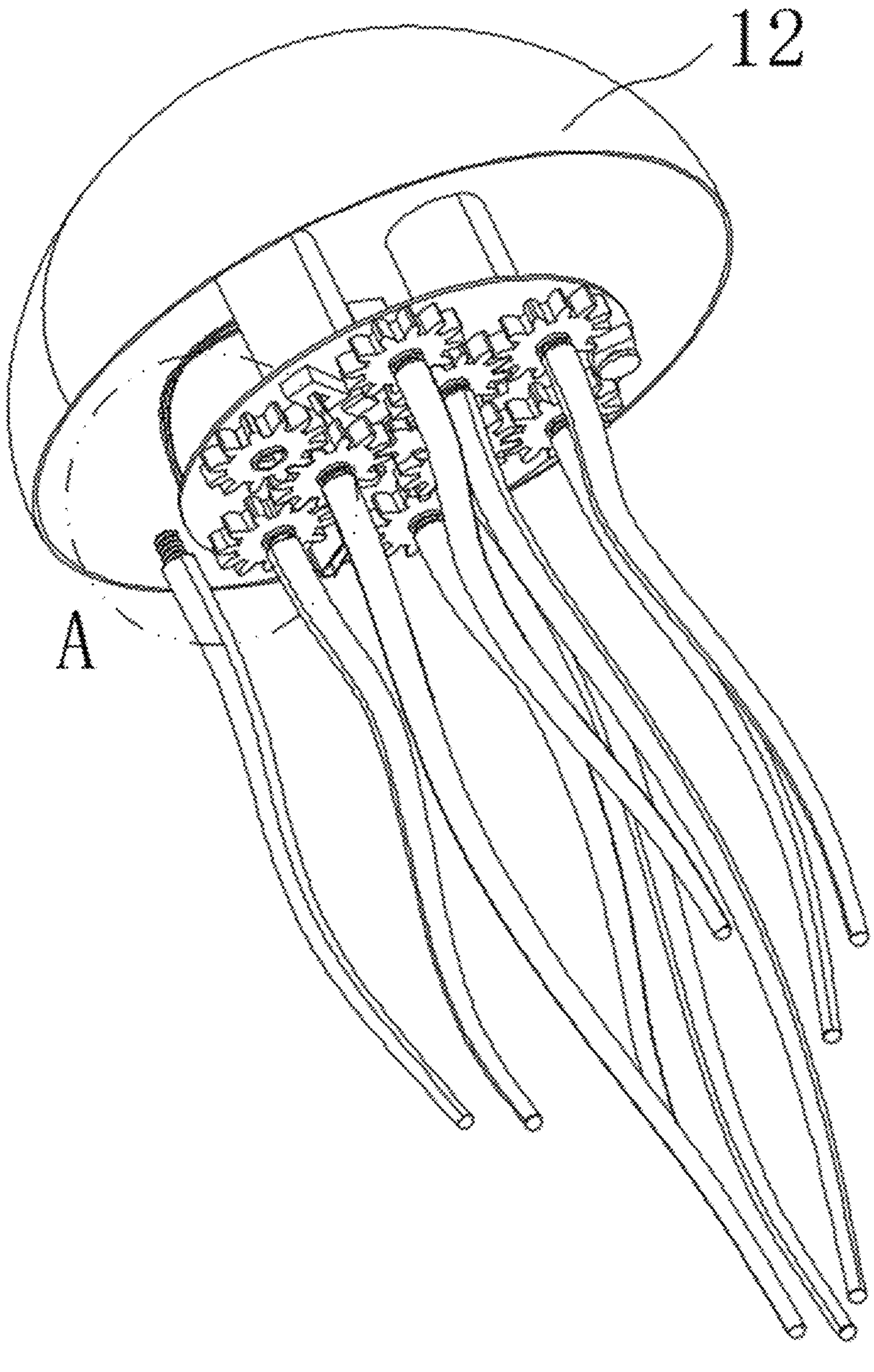
FIG. 5 is a schematic structural view of the first embodiment of the present application after the lower shell is removed.
Figure 6:
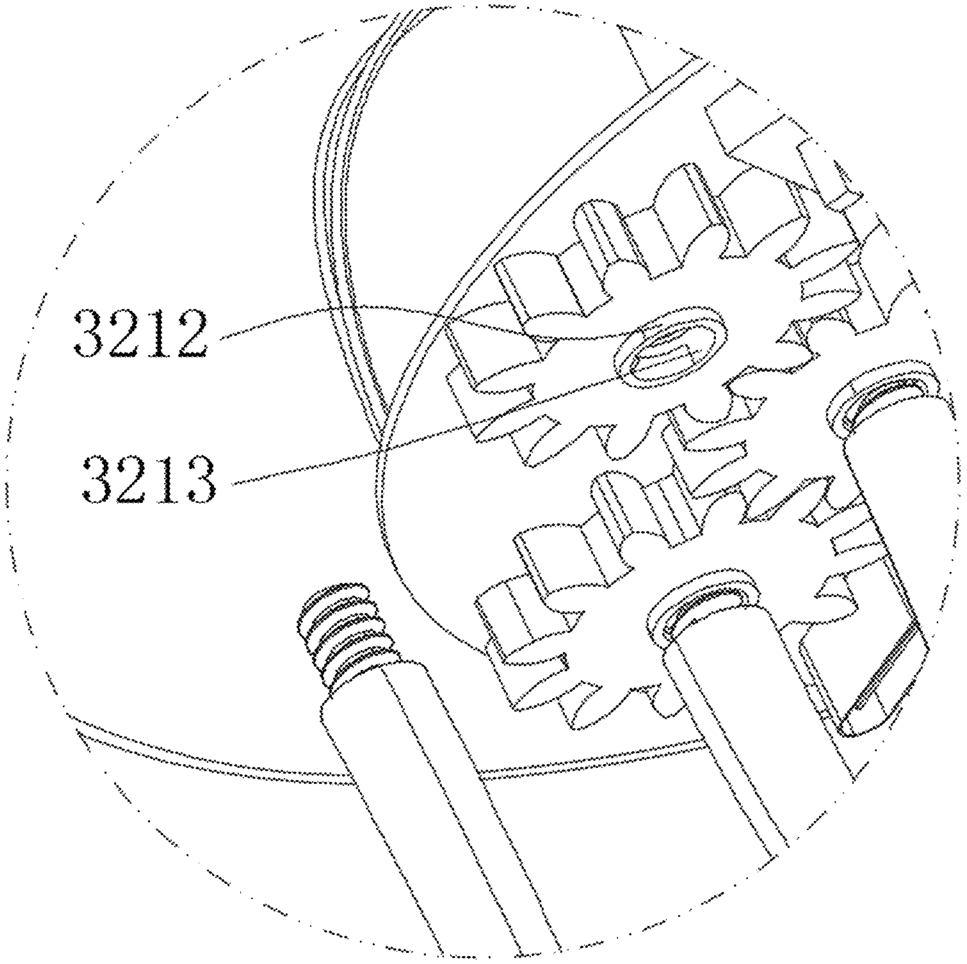
FIG. 6 is an enlarged view at A in FIG. 5.

As shown in FIGS. 4 to 6, the first gear 321 and the second gear 322 have the same structure. Upper bosses 3211 are arranged at the top of the first gear 321, and lower bosses 3212 are arranged at the bottom of the first gear 321. The lower bosses 3212 are provided with cavities 3213 for installing the tentacles 2, and the lower bosses 3212 are arranged in the annular flange 111 or the annular counterbore 112.

The tentacles 2 and the cavities 3213 are connected by interference fit, magnetic attraction, thread or buckle.

FIG. 6 shows the structural schematic diagram of the connection between the tentacles 2 and the cavities 3213 in a threaded way. When installing the tentacles 2, a stable connection can be formed only by screwing the tentacles 2 into the cavities 3213.

Figure 7:
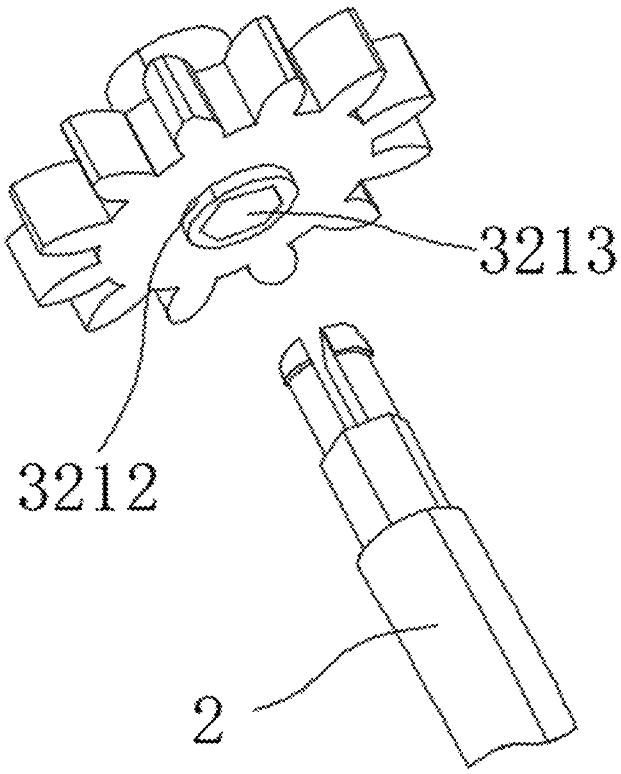
FIG. 7 is a schematic structural view of another connection mode of tentacles in the first embodiment of the present application.

FIG. 7 shows a schematic structural diagram of the connection between the tentacles 2 and the cavities 3213 by a snap. When installing the tentacles 2, it is only necessary to insert the tentacles 2 into the cavities 3213, and the snap at the front end of the tentacle 2 passes through the gear and hooks the end face of the gear, thus forming a stable connection.

As shown in FIG. 2, a control device is arranged in the shell, and the control device includes a PCB board 4, which is connected with the lower shell 11 through screws, and the driving device is electrically connected with the PCB board 4.

Figure 8:
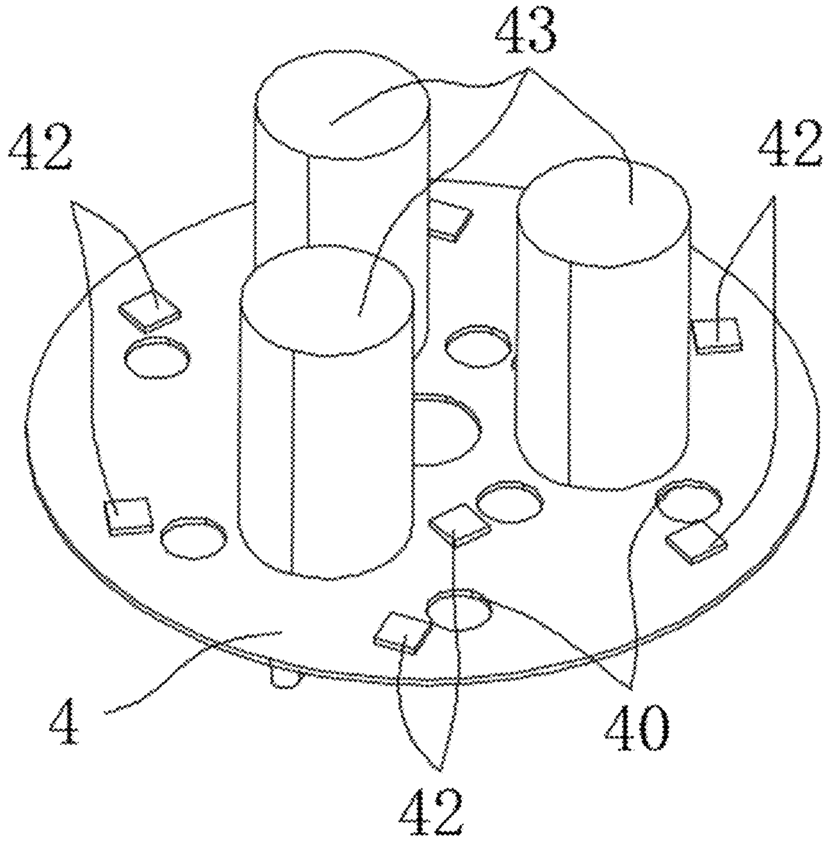
FIG. 8 is a schematic structural diagram of a PCB according to the first embodiment of the present application.
Figure 9:
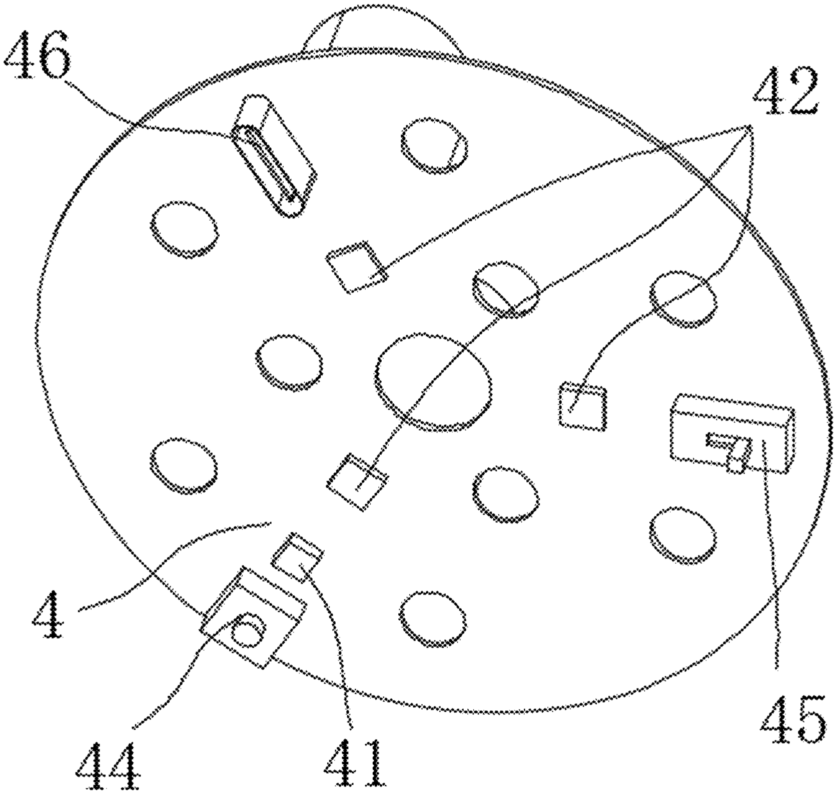
FIG. 9 is a schematic structural view of the PCB board in the first embodiment of the present application from another perspective.
Figure 10:
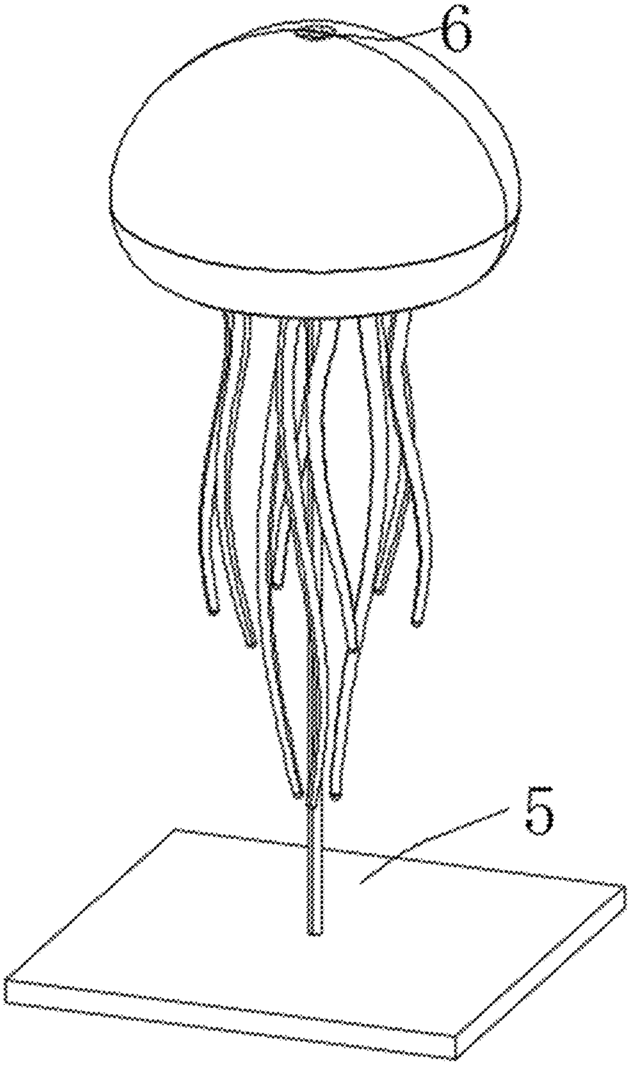
FIG. 10 is a schematic diagram of the first embodiment of the present application supported and installed by a support frame.

As shown in FIGS. 8 and 9, the PCB board 4 is provided with second through holes 40 with the same number as the upper bosses 3211; the upper bosses 3211 pass through the second through holes 40, and the upper bosses 3211 are in clearance fit with the second through holes 40.

With the above structure, the upper and lower ends of the first gear 321 and the second gear 322 are limited by the PCB board 4 and the lower shell 11 respectively, and the first gear 321 and the second gear 322 can passively rotate between the PCB board 4 and the lower shell 11.

This arrangement can simplify the structure, and the PCB board 4 can be used as both a control board and a structural member.

As shown in FIG. 9, the control device further comprises an induction module or a non-contact control module, the induction module or the non-contact control module being electrically connected to the PCB board, used to control the tentacle animal bionic light to turn on or off, set the time to turn on or off, or the color of the display, etc.

The induction module can be a sound induction module, a human body induction module, an infrared induction module or a vibration induction module. Among them, the human body induction module is controlled by sensors detecting changes in the infrared spectrum of the human body; the infrared induction module is controlled wirelessly using infrared rays, usually through a remote control.

The non-contact control module can be a Bluetooth module, a WIFI transmission module or a radio frequency module; the Bluetooth module can realize the data exchange between the cell phone and the tentacle animal bionic lamp; and the WIFI transmission module can remotely monitor and control the tentacle animal bionic lamp through the cell phone APP.

In this embodiment, the tentacle animal bionic lamp use a sound induction module41. When the sound induction module 41 detects a sound that can turn it on, the sound induction module 41 can control the PCB 4 to supply power to the light source, so that the light source lights up.

A light source is also arranged in the shell, and the light source is electrically connected with the PCB board 4. The light source can be arranged on the PCB board 4 or in the upper shell 12 or the lower shell 11. In this embodiment, the light source is colored LED lamps 42, which can emit different colors, and can be changed into different colors according to the setting, with good visual effect. The LED lamps 42 are arranged on both sides of the PCB board 4 at the same time, so that when the LED lamps 42 are powered on, the whole shell component 1 can emit light, and there is no dead angle or blind area.

Further, a circuit board can be arranged on the upper shell 12 or the lower shell 11; LED lamps are arranged on the circuit board and are located at the top of the first gear 321 and the second gear 322, and the light emitting direction of the LED lamps faces the first gear 321 and the second gear 322; the tentacles 2 are made of light-transmitting materials, so that when the LED lamps emit light, the light will spread along the tentacles 2, further enhancing the visual effect.

As shown in FIG. 8, a battery 43 is provided on the PCB 4, and the battery 43 is electrically connected with the PCB 4. The PCB board 4 is also provided with a light effect switching button 44, a mode selection switch 45 and a charging interface 46.

In this embodiment, the light emitting mode of the lamp can be switched by pressing the light effect switching button 44, for example, once it is pressed, it can be switched to a constantly lit mode, and then it can be switched to a breathing light mode.

In this embodiment, the mode selection switch 45 has three switchable gears, one of which is in an off state, the second is in a voice control mode, and the third is in the manual mode. In both the voice control mode and manual mode, the lighting effect can be switched by pressing the lighting effect switching button 44.

The upper shell 12 and the lower shell 11 are connected by means of threads, screws, buckles, gluing or welding. In this embodiment, the upper shell 12 and the lower shell 11 are connected by ultrasonic welding.

The tentacle animal bionic lamp also includes a support frame 5; the shell is provided with a first mounting hole 6 for hanging jellyfish lamp and a second mounting hole (not shown) for mounting the support frame 5, and the support frame 5 supports the tentacle animal bionic lamp integrally through the second mounting hole. In this way, the tentacle animal bionic lamp can be hung in the scene to be used, and can also be placed in the scene to be used through the support frame 5.

Figure 11:
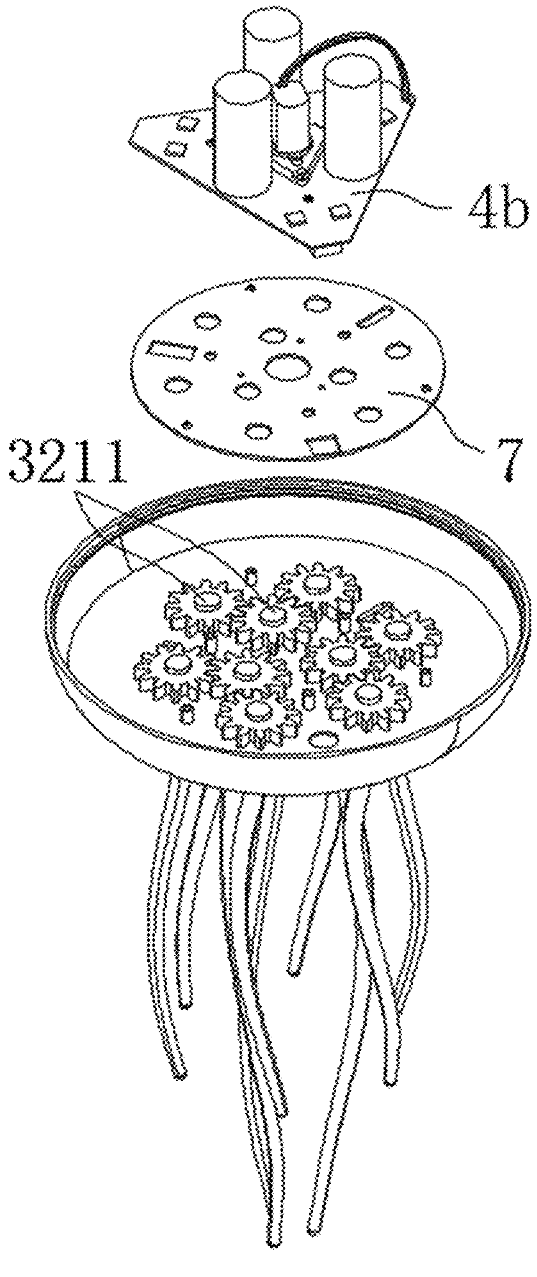
FIG. 11 is an exploded view of another embodiment of the first embodiment of the present application.

As another embodiment of this embodiment, as shown in FIG. 11, a gear cover plate 7 is provided on the lower shell 11, and the gear cover plate 7 is provided with third through holes 70 with the same number as the upper bosses 3211; the upper bosses 3211 pass through the third through holes 70, and the upper bosses 3211 are in clearance fit with the third through holes 70.

In this embodiment, the gear cover plate 7 is made of a light-transmitting material, and the gear cover plate 7 can be made by injection molding, with a low cost.

In this embodiment, the PCB **4*b*** is designed in a triangular shape, which can reduce the use area of the PCB and reduce the loss during cutting, and the loss of the triangular PCB is small during cut, thereby effectively reducing the production cost.

In order to expand the application scene of the product and make it be used outdoors, the product has been expanded, therefore there is a second embodiment. The overall structure of this embodiment is the same as that of the first embodiment, but the difference is that the upper shell **12*b* is made of a light-transmitting flexible material, and a solar panel 120*b*** is arranged on the upper shell and is electrically connected with the PCB board.

Figure 12:
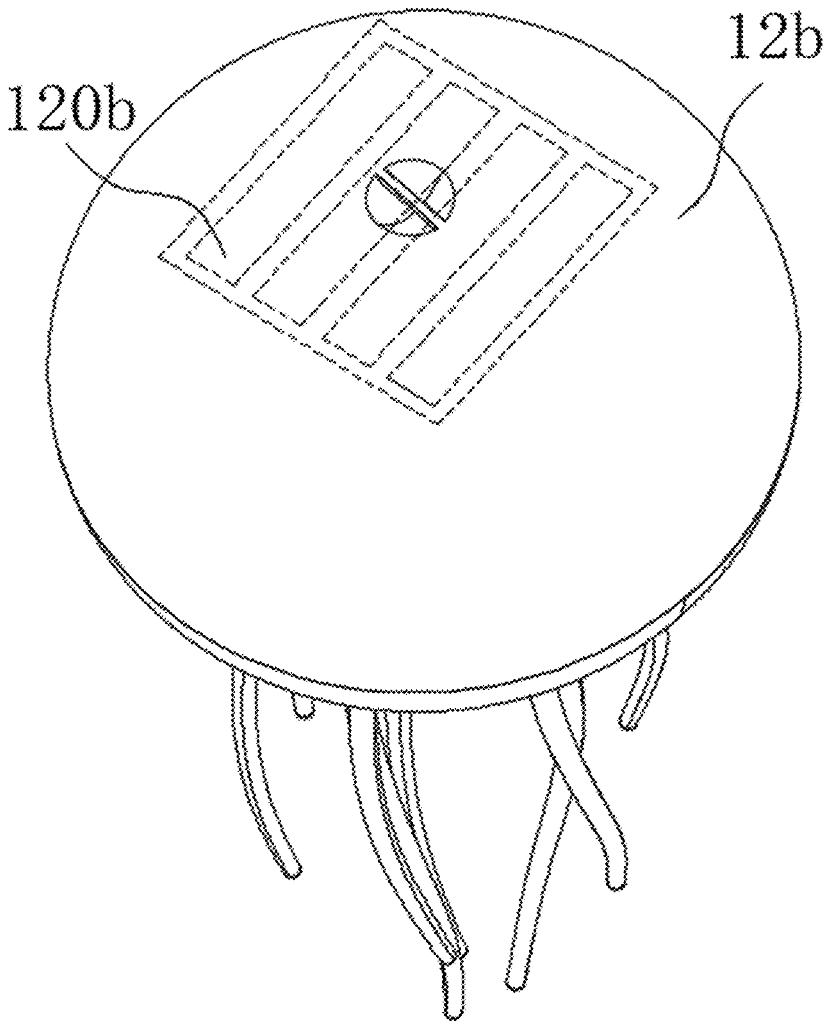
FIG. 12 is a structural schematic diagram of a second embodiment of the present application.

In this embodiment, as shown in FIG. 12, the solar panel **120*b* is arranged inside the upper shell 12*b*, and the solar panel 120*b* is parallel to the bottom surface of the upper shell 12*b***.

Figure 13:
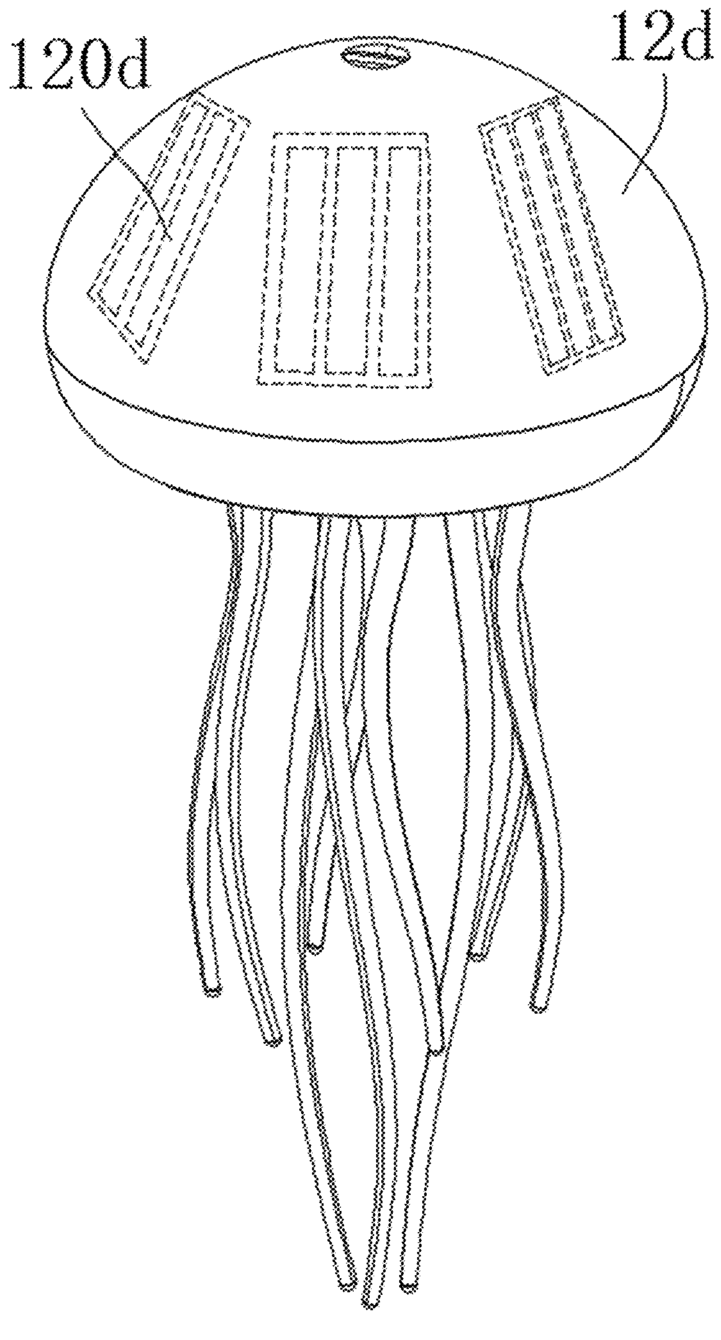
FIG. 13 is a schematic structural view from another perspective of the second embodiment of the present application.

As another embodiment, as shown in FIG. 13, solar panels **120*d* are arranged in an annular array inside the upper shell 12*d* to increase the area and absorb more solar energy, and the solar panels 120*d*** are electrically connected with the PCB.

The reason why the upper shell **12*b* and the upper shell 12*d* are made of flexible materials is because the size of the product usually needs to be larger when used outdoors than when used indoors. If the upper shell 12*b* and the upper shell 12*d*** are made of hard materials, they occupy a large volume and are inconvenient to store and transport.

The solar panel **120*d* may be disposed not only inside the upper shell 12*d*, but also outside the upper shell 12*d*, or the solar panel 120*d* may be integrally disposed with the upper shell 12*d***.

Meanwhile, the bottoms of the upper shell **12*b* and the upper shell 12*d*** can be made of hard materials to facilitate the connection with the lower shell.

Of course, the upper shell **12*b* and the upper shell 12*d*** may also be sleeved on the lower shell.

Figure 14:
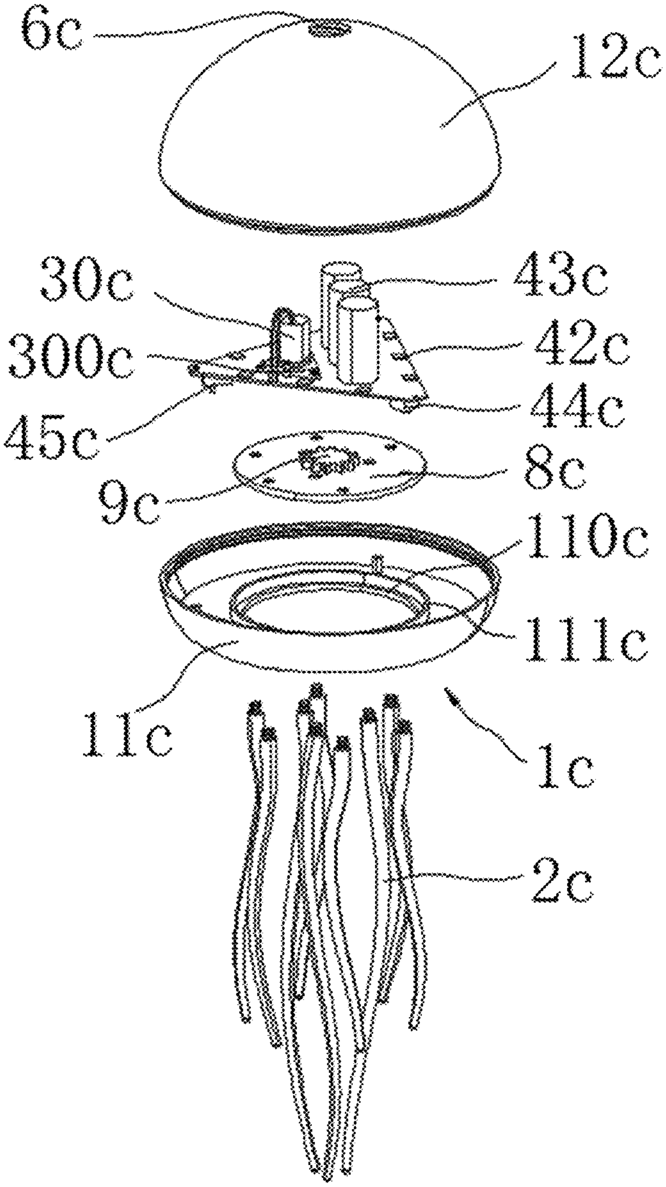
FIG. 14 is a structural schematic diagram of a third embodiment of the present application.

FIG. 14 is a structural schematic diagram of a third embodiment of the present application.

As shown in FIG. 14, a tentacle animal bionic lamp includes a shell component **1*c* and a plurality of curved tentacles 2*c* detachably connected with the shell component 1*c***.

The shell component **1*c*** includes a shell.

In this embodiment, the bionic lamp of tentacle animals is designed to be similar to the shape of jellyfish. The shell includes a lower shell **11*c* and an upper shell 12*c*, wherein the lower shell 11*c* is made of a hard material, preferably a hard light-transmitting material, such as PE, PC, PS or glass; The upper shell 12***c* may be made of a hard material or a flexible material. The arrangement of the lower shell 11*c* and the upper shell 12*c* in this embodiment may be the same as that in the first and second embodiments.

The lower shell 11*c* is provided with a first through hole 110*c*, and an annular flange 111*c* with an inner diameter larger than that of the first through hole 110*c* is provided inside the lower shell 11*c*, and the annular flange 111*c* is coaxially arranged with the first through hole 110*c*. Of course, the annular flange here can also be an annular counterbore in the first and second embodiments.

The upper annular flange 111*c* is used to limit the bottom of the gear.

A driving device for driving the tentacles 2*c* to rotate is arranged in the shell. In this embodiment, the driving device includes a driving motor 30*c*, which is fixed on the lower shell 11*c* through a motor bracket 300*c*, and a driving gear (not shown) is arranged on the output shaft of the driving motor 30*c*.

A rotating disc 8*c* is rotatably arranged on the shell. In this embodiment, the rotating disc 8*c* is arranged in the annular flange 111*c*, and the side wall of the rotating disc 8*c* is in clearance fit with the inner wall of the annular flange 111*c*, that is, the rotating disc 8*c* can freely rotate in the annular flange 111*c*.

The rotating disc 8*c* is provided with a driven gear 9*c*, and the driving gear is meshed with the driven gear 9*c*; the tentacles 2*c* are detachably connected to the rotating disc 8*c*, and the driving motor 30*c* drives all the tentacles 2*c* to rotate as a whole through the rotating disc 8*c*.

The tentacles 2*c* and the rotating disc 8*c* are connected by interference fit, magnetic attraction, thread or buckle.

In this embodiment, the structure diagram of the connection between the tentacles 2*c* and the rotating disc 8*c* is shown. When installing the tentacles 2*c*, a stable connection can be formed only by screwing the tentacles 2*c* into the rotating disc 8*c*.

Of course, the tentacle 2*c* can also be connected by a snap as in the first embodiment.

A control device is arranged in the shell, and the control device includes a PCB board 4*c*, which is connected with the lower shell 11*c* through screws, and the driving device is electrically connected with the PCB board 4*c*.

In order to limit the axial movement of the rotating disc 8*c*, a pressing plate for preventing the rotating disc 8*c* from escaping from the annular flange or annular counterbore can be arranged on the lower shell. In this embodiment, the PCB 4*c* can be regarded as a pressing plate structure.

The control device further comprises an induction module or a non-contact control module, the induction module or the non-contact control module being electrically connected to the PCB board, used to control the tentacle animal bionic light to turn on or off, set the time to turn on or off, or the color of the display, etc.

The induction module can be a sound induction module, a human body induction module, an infrared induction module or a vibration induction module. Among them, the human body induction module is controlled by sensors detecting changes in the infrared spectrum of the human body; the infrared induction module is controlled wirelessly using infrared rays, usually through a remote control.

The non-contact control module can be a Bluetooth module, a WIFI transmission module or a radio frequency module; the Bluetooth module can realize the data exchange between the cell phone and the tentacle animal bionic lamp; and the WIFI transmission module can remotely monitor and control the tentacle animal bionic lamp through the cell phone APP.

In this embodiment, the tentacle animal bionic lamp uses a sound induction module41. When the sound induction module 41 detects a sound that can turn it on, the sound induction module 41 can control the PCB 4 to supply power to the light source, so that the light source lights up.

A light source is also arranged in the shell, and the light source is electrically connected with the PCB 4*c*. The light source can be arranged on the PCB 4*c* or in the upper shell 12*c* or the lower shell 11*c*. In this embodiment, the light source is colored LED lamps 42*c*, which can emit light of different colors and can be changed into different colors according to the setting, with a good visual effect. The LED lamps 42*c* are arranged on both sides of the PCB 4*c* at the same time, so that when the LED lamps 42*c* are energized, the whole shell component 1*c* can emit light without dead corners or blind areas, with a good visual effect.

The PCB 4 is provided with a battery 43*c*, which is electrically connected with the PCB 4*c*. The PCB 4*c* is also provided with a light effect switching button 44*c*, a mode selection switch 45*c* and a charging interface (not shown).

In this embodiment, the light emitting mode of the lamp can be switched by pressing the light effect switching button 44*c*, for example, once it is pressed, it can be switched to a constantly lit mode, and then it can be switched to a breathing light mode.

In this embodiment, the mode selection switch 45*c* has three switchable gears, one of which is in an off state, the second is in a voice control mode, and the third is a manual mode. In both the voice control mode and manual mode, the lighting effect can be switched by pressing the lighting effect switching button 44*c*.

The upper shell 12*c* and the lower shell 11*c* are connected by threads, screws, buckles, gluing or welding. In this embodiment, the upper shell 12*c* and the lower shell 11*c* are connected by ultrasonic welding.

The biomimetic lamp for tentacle also includes a support frame (not shown); the shell is provided with a first mounting hole 6*c* for hanging the jellyfish lamp and a second mounting hole (not shown) for mounting the support frame; the support frame supports the tentacle animal bionic lamp integrally through the second mounting hole. In this way, the bionic lamp of tentacle animals can be hung in a scene to be used, and can also be placed in a scene to be used through the support frame.

This embodiment has simpler structure and lower production cost, which is beneficial to popularization and use.

The technical means disclosed in the solution of the present application are not limited to the technical means disclosed in the above embodiments, but also include the technical solution composed of any combination of the above technical features. It should be pointed out that for those skilled in the art, several improvements and embellishments can be made without departing from the principle of the present application, and these improvements and embellishments are also regarded as the protection scope of the present application.

What is claimed is:

1. A tentacle animal bionic lamp, comprising a shell component and a plurality of curved tentacles detachably connected with the shell component;

wherein the shell component comprises a shell made of a light-transmitting material, and a driving device for driving the tentacles to rotate is arranged in the shell;

a control device is arranged in the shell, the control device comprises a printed circuit board (PCB) board electrically connected with the driving device;

the shell is further provided with a light source electrically connected with the PCB board; and the driving device comprises a driving motor, and an output shaft of the driving motor is provided with a driving gear; a driven gear set is rotatably arranged on the shell, and the driving gear is meshed with the driven gear set; the tentacles are detachably connected to the driven gear set, and the driving motor drives each tentacle to rotate independently through the driven gear set.

2. The tentacle animal bionic lamp according to claim 1, wherein the driven gear set comprises a first driven gear set and a second driven gear set; and the driving gear is meshed with the first driven gear set; the first driven gear set is meshed with the second driven gear set.

3. The tentacle animal bionic lamp according to claim 1, wherein the shell comprises a lower shell and an upper shell, both of which are made of hard materials; the lower shell is provided with a first through hole, and an annular flange or an annular counterbore with an inner diameter larger than that of the first through hole is arranged inside the lower shell, and the annular flange or the annular counterbore is arranged coaxially with the first through hole.

4. The tentacle animal bionic lamp according to claim 3, wherein the first driven gear set comprises more than three first gears; the second driven gear set comprises more than six second gears, and a number of the second gears is twice that of the first gears; and one of the first gears drives two of the second gears to rotate;

the first gear and the second gear have a same structure; upper bosses are arranged at a top of the first gear, and lower bosses are arranged at a bottom of the first gear; cavities for installing the tentacles are arranged on the lower bosses; the lower bosses are arranged in the annular flange or the annular counterbore, and a side wall of the lower boss is in clearance fit with the annular flange or the annular counterbore.

5. The tentacle animal bionic lamp according to claim 4, wherein the PCB board is provided with second through holes with a same number as the upper bosses, and the upper bosses pass through the second through holes and are in clearance fit with the second through holes.

6. The tentacle animal bionic lamp according to claim 4, wherein a gear cover plate is arranged on the lower shell, and the gear cover plate is provided with third through holes with a same number as the upper bosses; and the upper bosses pass through the third through holes and are in clearance fit with the third through holes.

7. The tentacle animal bionic lamp according to claim 1, wherein the control device further comprises an induction module or a non-contact control module, the induction module or the non-contact control module is electrically connected to the PCB board;

the induction module is a sound induction module, a human body induction module, an infrared induction module or a vibration induction module;

the non-contact control module is a Bluetooth module, a WIFI transmission module or a radio frequency module; and a battery is arranged in the shell, and the battery is electrically connected with the PCB board; the light source is arranged at two sides of the PCB board; the PCB board is also provided with a light effect switching button, a mode selection switch and a charging interface.

8. The tentacle animal bionic lamp according to claim 4, wherein the upper shell and the lower shell are connected by means of thread, buckle or welding; the tentacles and the cavities are connected by interference fit, magnetic attraction, thread or buckle.

9. The tentacle animal bionic lamp according to claim 1, further comprising a support frame; wherein the shell is provided with a first mounting hole for hanging a jellyfish lamp and a second mounting hole for mounting the support frame.

10. A tentacle animal bionic lamp, comprising a shell component and a plurality of curved tentacles detachably connected with the shell component;

wherein the shell component comprises a shell consisting of a lower shell and an upper shell which are detachably connected, and the lower shell is made of a hard material; the upper shell is made of a light-transmitting flexible material;

a driving device for driving the tentacles to rotate is arranged in the shell;

a control device is arranged in the shell, the control device comprises a PCB board, the driving device is electrically connected with the PCB board;

the shell is further provided with a light source electrically connected with the PCB board; and the driving device comprises a driving motor, and an output shaft of the driving motor is provided with a driving gear; a driven gear set is rotatably arranged on the lower shell, and the driving gear is meshed with the driven gear set; the tentacles are detachably connected to the driven gear set, and the driving motor drives each tentacle to rotate independently through the driven gear set.

11. The tentacle animal bionic lamp according to claim 10, wherein the driven gear set comprises a first driven gear set and a second driven gear set; and the driving gear is meshed with the first driven gear set; the first driven gear set is meshed with the second driven gear set.

12. The tentacle animal bionic lamp according to claim 10, wherein a first through hole is arranged on the lower shell, and an annular flange or annular counterbore with an inner diameter larger than that of the first through hole is arranged inside the lower shell, and the annular flange or annular counterbore is arranged coaxially with the first through hole; and a solar panel is arranged on the upper shell, and the solar panel is electrically connected with the PCB.

13. The tentacle animal bionic lamp according to claim 12, wherein the first gear set comprises more than three first gears, and the second gear set comprises more than six second gears; a number of the second gears is twice that of the first gears, and one of the first gears drives two of the second gears to rotate; and the first gear and the second gear have a same structure; upper bosses are arranged at a top of the first gear; lower bosses are arranged at a bottom of the first gear; cavities for installing the tentacles are arranged on the lower bosses; the lower bosses are arranged in the annular flange or annular counterbore; and a side wall of the lower boss is in clearance fit with the annular flange or annular counterbore.

14. The tentacle animal bionic lamp according to claim 13, wherein the PCB board is provided with second through holes with a same number as the upper bosses; the upper bosses pass through the second through holes, and the upper bosses are in clearance fit with the second through holes.

15. The tentacle animal bionic lamp according to claim 13, wherein a gear cover plate is arranged on the lower shell, and the gear cover plate is provided with third through holes with a same number as the upper bosses; the upper bosses pass through the third through holes, and the upper bosses are in clearance fit with the third through holes.

16. The tentacle animal bionic lamp according to claim 10, wherein the control device further comprises an induction module or a non-contact control module, the induction module or the non-contact control module is electrically connected to the PCB board;

the induction module is a sound induction module, a human body induction module, an infrared induction module or a vibration induction module;

the non-contact control module is a Bluetooth module, a WIFI transmission module or a radio frequency module; and a battery is arranged in the shell, and the battery is electrically connected with the PCB; the light source is arranged at two sides of the PCB board; the PCB board is also provided with a power switch, a mode selection switch and a charging interface.

17. The tentacle animal bionic lamp according to claim 13, wherein the upper shell and the lower shell are connected by means of thread, buckle or welding; the tentacles and the cavities are connected by interference fit, magnetic attraction, thread or buckle.

18. A tentacle animal bionic lamp, comprising a shell component and a plurality of curved tentacles detachably connected with the shell component;

wherein the shell component comprises a shell made of a light-transmitting material, and a driving device for driving the tentacles to rotate is arranged in the shell;

a control device is arranged in the shell, the control device comprises a PCB board, and the driving device is electrically connected with the PCB board; the shell is further provided with a light source electrically connected with the PCB board; and the driving device comprises a driving motor, and an output shaft of the driving motor is provided with a driving gear; a rotating disc is rotatably arranged on the shell, a driven gear is arranged on the rotating disc, and the driving gear is meshed with the driven gear; the tentacles are detachably connected to the rotating disc, and the driving motor drives all the tentacles to rotate as a whole through the rotating disc.

19. The tentacle animal bionic lamp according to claim 18, wherein the shell comprises a lower shell and an upper shell, the upper shell and the lower shell are made of hard materials, and the lower shell is provided with a first through hole; an annular flange or an annular counterbore with an inner diameter larger than that of the first through hole is arranged inside the lower shell, and the annular flange or the annular counterbore is arranged coaxially with the first through hole; and a side wall of the rotating disc is in clearance fit with the annular flange or the annular counterbore; a pressing plate is arranged on the lower shell for preventing the rotating disc from falling out of the annular flange or the annular counterbore.

20. The tentacle animal bionic lamp according to claim 18, wherein the control device further comprises an induction module or a non-contact control module, the induction module or the non-contact control module is electrically connected to the PCB board;

the induction module is a sound induction module, a human body induction module, an infrared induction module or a vibration induction module;

the non-contact control module is a Bluetooth module, a WIFI transmission module or a radio frequency module;

a battery is arranged in the shell, and the battery is electrically connected with the PCB; the light source is arranged at two sides of the PCB board; the PCB board is further provided with a power switch, a mode selection switch and a charging interface;

the upper shell and the lower shell are connected by thread, buckle or welding; the tentacles are connected with the rotating disc through interference fit, magnetic attraction, thread or buckle; and the shell is provided with a first mounting hole for hanging a jellyfish lamp.

* * * * *